(12) United States Patent
Lee et al.

(10) Patent No.: US 12,363,598 B2
(45) Date of Patent: Jul. 15, 2025

(54) METHOD AND APPARATUS FOR SUSPENDING MEASUREMENT WITH MEASUREMENT CONFIGURATION IN A WIRELESS COMMUNICATION SYSTEM

(71) Applicant: LG ELECTRONICS INC., Seoul (KR)

(72) Inventors: Oanyong Lee, Seoul (KR); Sunghoon Jung, Seoul (KR); Jongwoo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 395 days.

(21) Appl. No.: 17/904,750

(22) PCT Filed: Apr. 5, 2021

(86) PCT No.: PCT/KR2021/004212
§ 371 (c)(1),
(2) Date: Aug. 22, 2022

(87) PCT Pub. No.: WO2021/206390
PCT Pub. Date: Oct. 14, 2021

(65) Prior Publication Data
US 2023/0056411 A1  Feb. 23, 2023

(30) Foreign Application Priority Data

Apr. 9, 2020  (KR) .................. 10-2020-0043586

(51) Int. Cl.
*H04W 36/00* (2009.01)
*H04W 36/14* (2009.01)

(52) U.S. Cl.
CPC ........ *H04W 36/0088* (2013.01); *H04W 36/14* (2013.01)

(58) Field of Classification Search
CPC ................................. H04W 36/0088
See application file for complete search history.

(56) References Cited

U.S. PATENT DOCUMENTS

2021/0227417 A1\* 7/2021 Wang ................. H04W 24/10
2022/0116805 A1\* 4/2022 Wang ................. H04W 24/08
(Continued)

FOREIGN PATENT DOCUMENTS

WO  2020-034568  2/2020

OTHER PUBLICATIONS

PCT International Application No. PCT/KR2021/004212, International Search Report dated Jul. 2, 2021, 2 page.
(Continued)

*Primary Examiner* — Barry W Taylor
(74) *Attorney, Agent, or Firm* — LEE, HONG, DEGERMAN, KANG & WAIMEY

(57) ABSTRACT

A method and apparatus for suspending measurement with measurement configuration in a wireless communication system is provided. A wireless device receives, from a first cell, measurement configuration including a measurement frequency list and a suspension cell list. A wireless device perform measurements on at least one frequency included in the measurement frequency list. A wireless device moves to a second cell from the first cell. A wireless device stops the measurements and keeps the measurement configuration, based on determining that the second cell is included in the suspension cell list.

17 Claims, 11 Drawing Sheets

(56) References Cited

U.S. PATENT DOCUMENTS

2022/0386193 A1* 12/2022 Li .................... H04W 48/02
2024/0064530 A1* 2/2024 Parichehrehteroujeni ..................
                                                      H04W 24/08

OTHER PUBLICATIONS

Qualcomm Incorporated, "Discussion on early measurements during inter-RAT cell reselection," R2-1908676, 3GPP TSG RAN WG2 Meeting #107, Aug. 2019, 6 pages.
OPPO, "Open Issues for early measurement," R2-1914553, 3GPP TSG-RAN WG2 Meeting #108, Nov. 2019, 9 pages.
Samsung, "Remaining issues for early measurements upon UE mobility," R2-1915730, 3GPP TSG-RAN WG2#108 meeting, Nov. 2019, 6 pages.
LG Electronics Inc., "Considerations on validity area in NR," R2-1915821, 3GPP TSG-RAN WG2 Meeting #108, Nov. 2019, 7 pages.
3rd Generation Partnership Project, "Technical Specification Group Radio Access Network; NR; Radio Resource Control (RRC) protocol specification (Release 16)," Section 5.7.8 of 3GPP TS 38.331 V16.0.0, Mar. 2020, 835 pages.

\* cited by examiner

METHOD AND APPARATUS FOR SUSPENDING MEASUREMENT WITH MEASUREMENT CONFIGURATION IN A WIRELESS COMMUNICATION SYSTEM

CROSS-REFERENCE TO RELATED APPLICATION(S)

This application is the National Stage filing under 35 U.S.C. 371 of International Application No. PCT/KR2021/004212, filed on Apr. 5, 2021, which claims the benefit of earlier filing date and right of priority to Korean Application No. 10-2020-0043586, filed on Apr. 9, 2020, the contents of which are all hereby incorporated by reference herein in their entireties.

TECHNICAL FIELD

The present disclosure relates to a method and apparatus for suspending measurement with measurement configuration in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

DISCLOSURE OF INVENTION

Technical Problem

A wireless device could be configured with early measurements. The wireless device may perform measurement on the configured frequency and report the measurement results when network requests.

In the early measurement configuration, validity area can be configured. If cell list is included in a frequency in the validity area, the wireless device may keep the early measurement configuration while camping on the cell in the cell list. If cell list is not provided in a frequency in the validity area, the wireless device may keep the early measurement configuration while camping on any cell in the frequency. The wireless device, however, may delete the early measurement configuration and stop performing the early measurement when (re-)selected cell is out of validity area.

Such as under Non-Public Networks (NPN) deployment scenario, a cell with small coverage may be deployed together with normal cells on a frequency. In this case, the network may provide cell list in the validity area which only includes normal cells, because the NPN cells may not need early measurement reporting.

Then, if the wireless device reselects to the NPN cell, as the NPN cell is not included in the cell list in the validity area, the wireless device may delete the early measurement configuration and stop performing the early measurement. However, if the wireless device is in mobility, the wireless device may reselect back to normal cell soon. In this case, it may be unnecessary to delete the early measurement configuration.

Therefore, studies for suspending measurement with measurement configuration in a wireless communication system are required.

Solution to Problem

In an aspect, a method performed by a wireless device in a wireless communication system is provided. A wireless device receives, from a first cell, measurement configuration including a measurement frequency list and a suspension cell list. A wireless device perform measurements on at least one frequency included in the measurement frequency list. A wireless device moves to a second cell from the first cell. A wireless device stops the measurements and keeps the measurement configuration, based on determining that the second cell is included in the suspension cell list.

In another aspect, an apparatus for implementing the above method is provided.

Advantageous Effects of Invention

The present disclosure can have various advantageous effects.

According to some embodiments of the present disclosure, a wireless device could suspend early measurement while keeping measurement configuration efficiently.

For example, a wireless device configured to perform early measurements does not perform the early measurement when the wireless device (re)selects to a particular cell. The particular cell may be a cell with small coverage or does not need early measurement reporting. If the cell is deployed together with normal cells which needs early measurement reporting on a frequency, the wireless device could continue performing the early measurement when the wireless device reselects back to the normal cell.

According to some embodiments of the present disclosure, a wireless communication system could efficiently provide a solution for suspending early measurement without discarding measurement configuration.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

MODE FOR THE INVENTION

Figure 1:
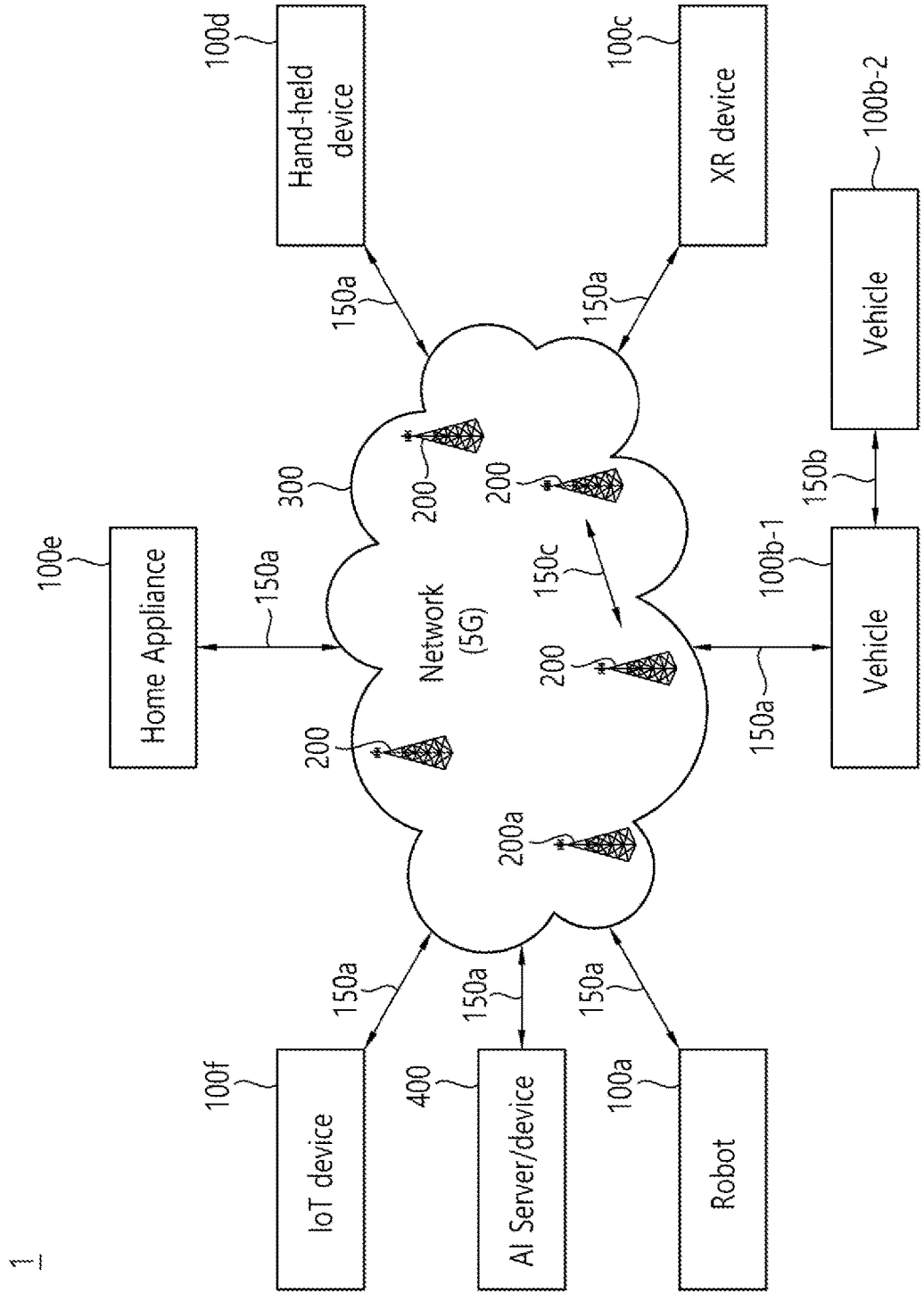
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR NR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
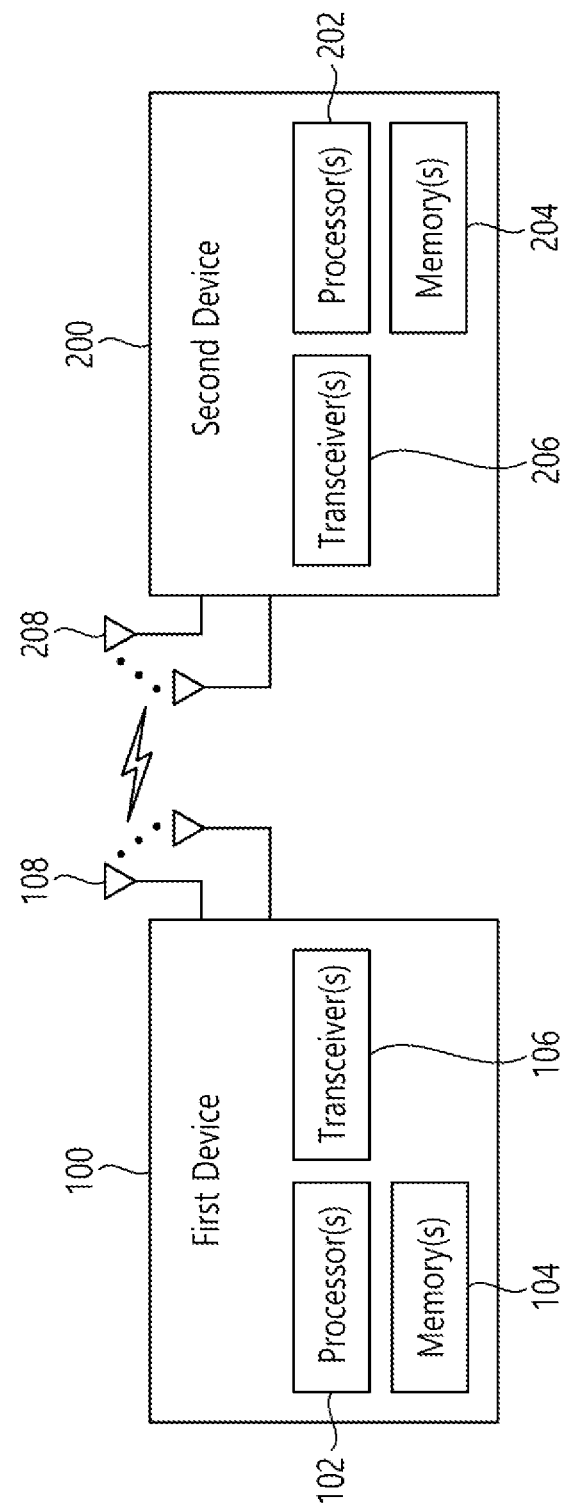
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
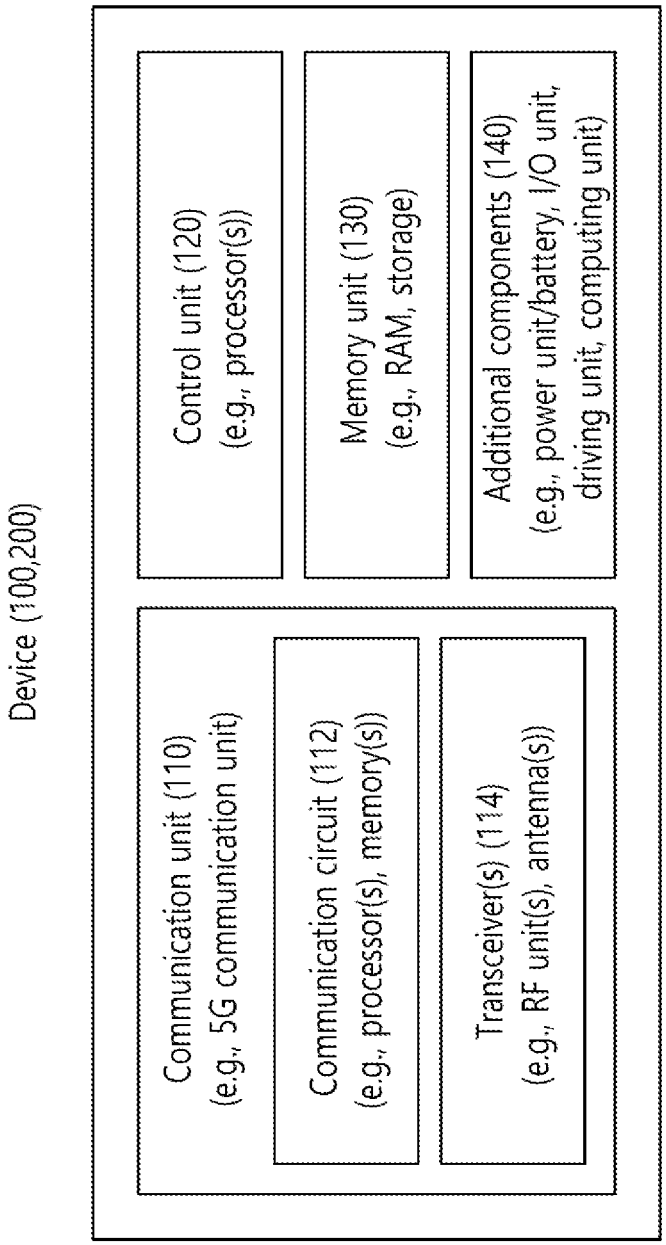
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
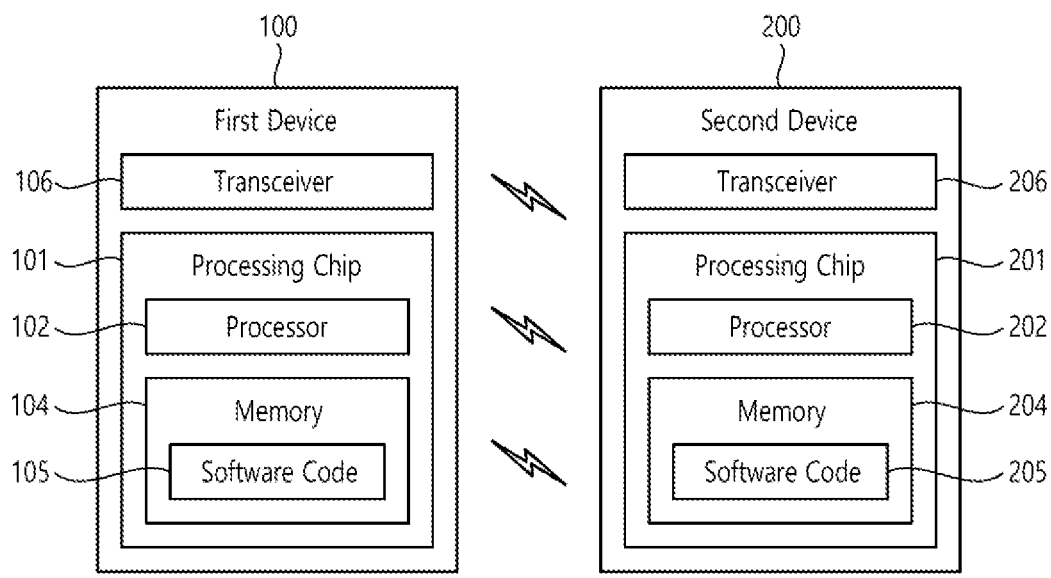
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
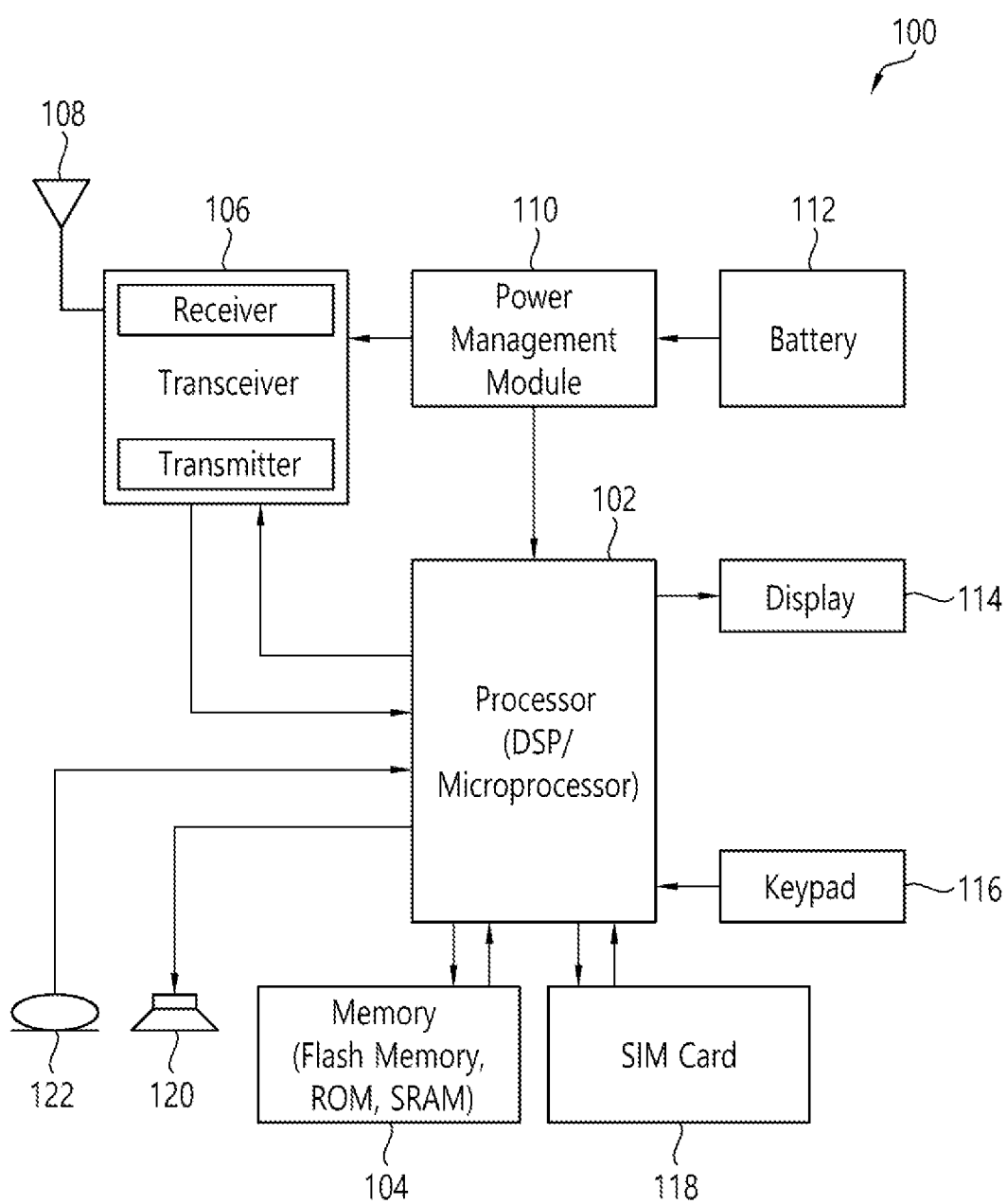
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
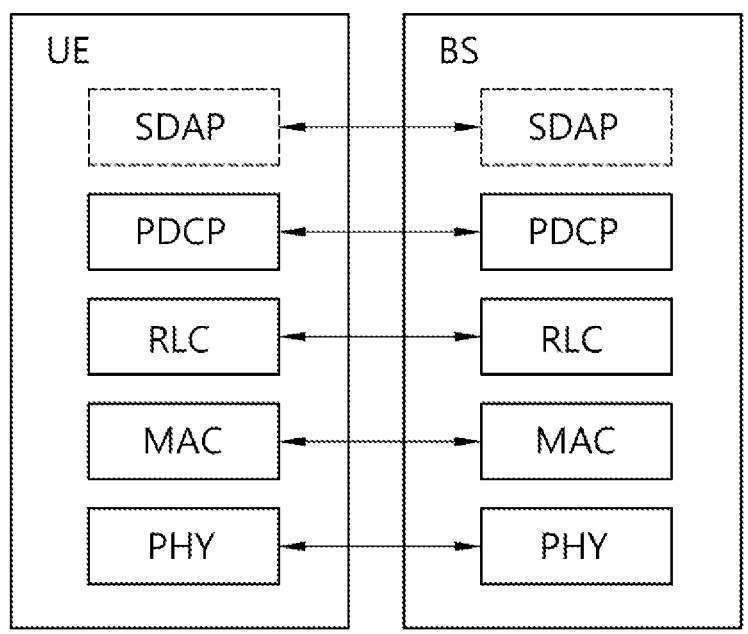
FIGS. 6 and 7 show an example of protocol stacks in a 3GPP based wireless communication system to which implementations of the present disclosure is applied.
Figure 7:
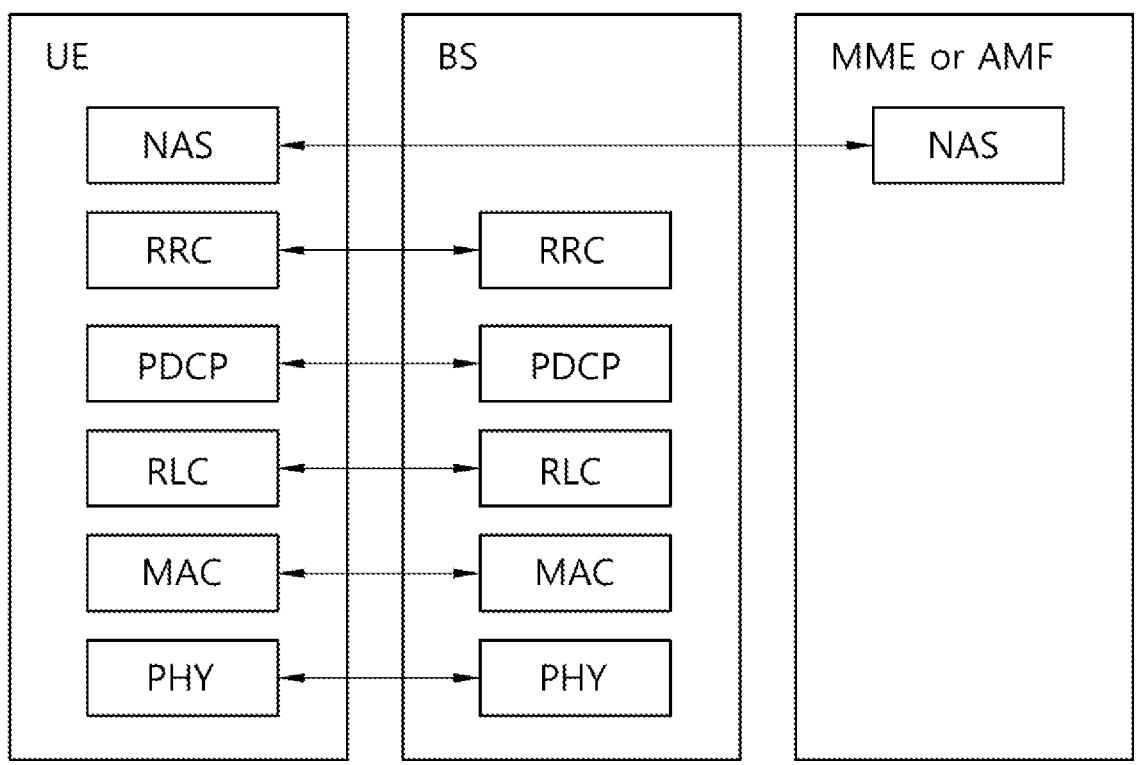

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
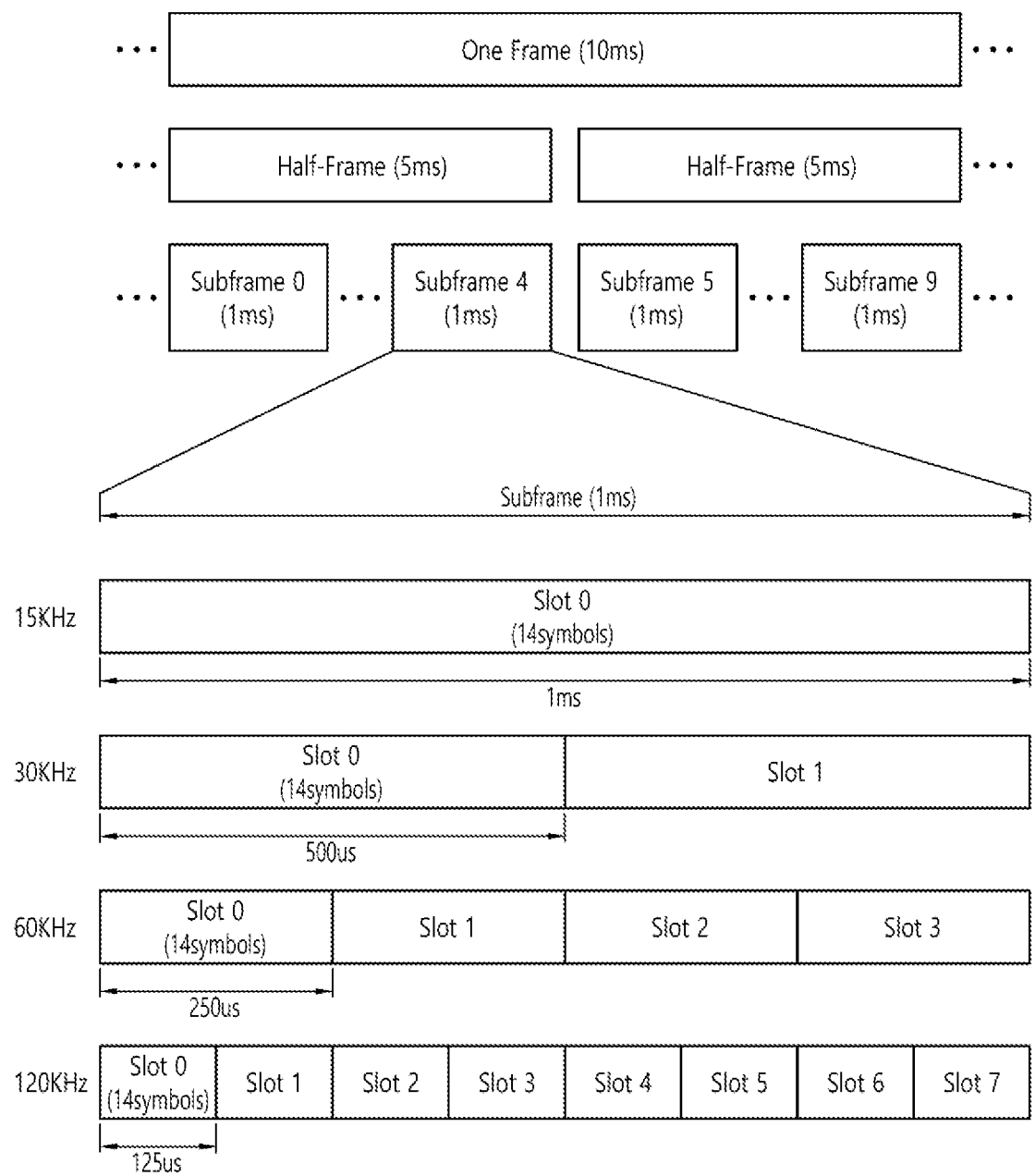
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2^u * 15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f = 2^u * 15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f = 2^u * 15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i} - 1$, where i is the number of the bandwidth part. The relation between the physical resource block $n_{PRB}$ in the bandwidth part i and the common resource block $n_{CRB}$ is as follows: $n_{PRB} = n_{CRB} N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
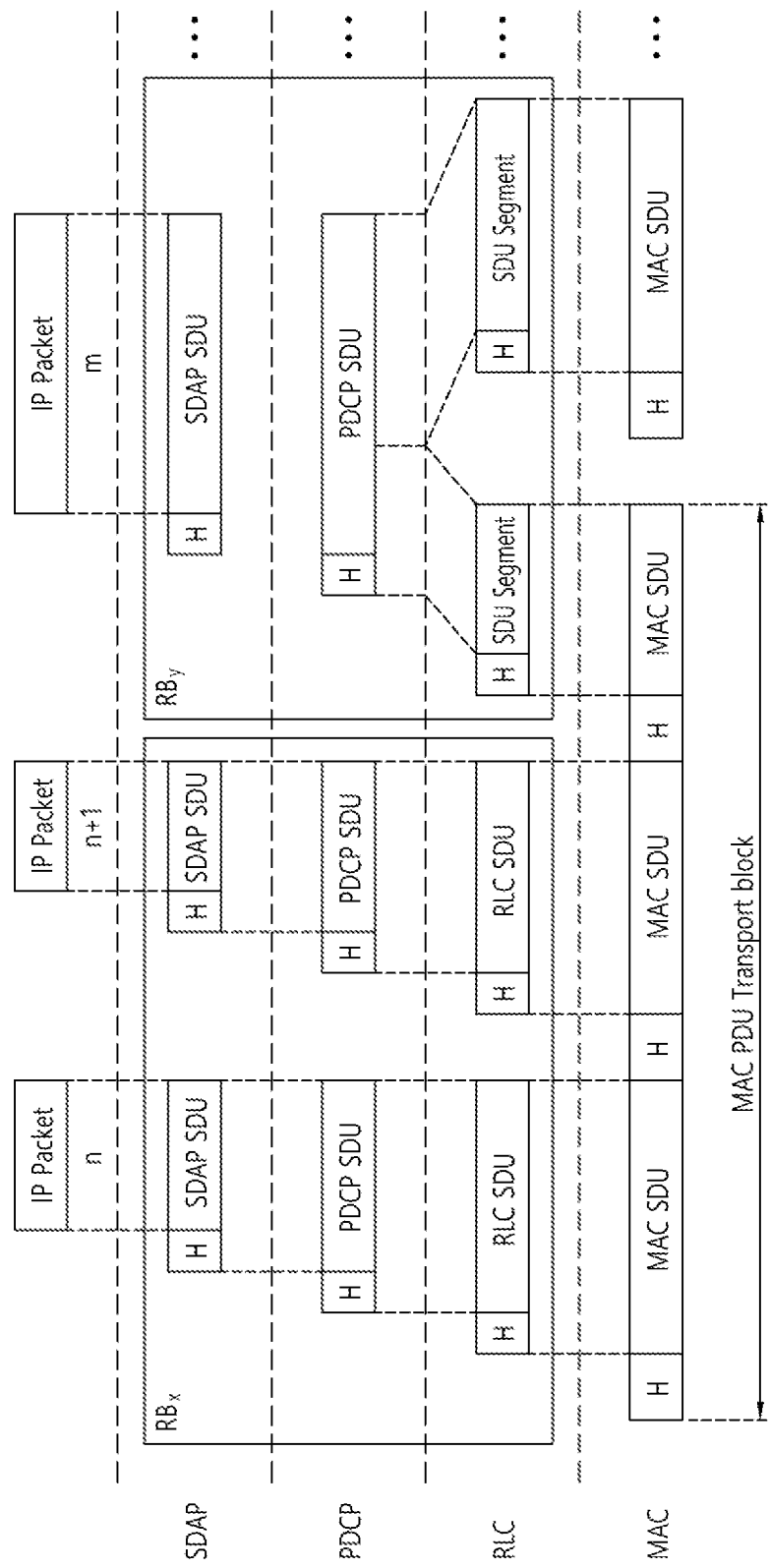
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Hereinafter, Idle/inactive Measurements are described. Section 5.7.8 of 3GPP TS 38.331 v16.0.0 may be referred.

This procedure specifies the measurements done by a UE in RRC_IDLE and RRC_INACTIVE when it has an idle/inactive measurement configuration and the storage of the available measurements by a UE in RRC_IDLE and RRC_INACTIVE.

While in RRC_IDLE or RRC_INACTIVE, T331 is running and the SIB1 contains idleModeMeasurements, the UE shall:

1> if the UE is capable of idle/inactive measurements for NE-DC and VarMeasIdleConfig does not contain a measIdleCarrierListEUTRA received from the RRCRelease message:

2> if SIB11 includes the measIdleConfigSIB and contains measIdleCarrierListEUTRA:

3> store or replace the measIdleCarrierListEUTRA of measIdleConfigSIB of SIB11 within VarMeasIdleConfig;

2> else:

3> remove the measIdleCarrierListEUTRA in VarMeasIdleConfig, if stored.

1> if the UE is capable of idle/inactive measurements for CA or NR-DC and VarMeasIdleConfig does not contain a measIdleCarrierListNR received from the RRCRelease message:
  2> if SIB11 includes the measIdleConfigSIB and contains measIdleCarrierListNR:
    3> store or replace the measIdleCarrierListNR of measIdleConfigSIB of SIB11 within VarMeasIdleConfig;
    3> remove the measIdleCarrierListNR in VarMeasIdleConfig, if stored.
1> for each entry in the measIdleCarrierListNR within VarMeasIdleConfig that does not contain an ssb-MeasConfig received from the RRCRelease message:
  2> if there is an entry in measIdleCarrierListNR in measIdleConfigSIB of SIB11 that has the same carrier frequency and subcarrier spacing as the entry in the measIdleCarrierListNR within VarMeasIdleConfig and that contains ssb-MeasConfig:
    3> store or replace the SSB measurement configuration from SIB11 into ssb-MeasConfig of the corresponding entry in the measIdleCarrierListNR within VarMeasIdleConfig;
  2> else if there is an entry in carrierFreqListNR of SIB4 with the same carrier frequency and subcarrier spacing as the entry in measIdleCarrierListNR within VarMeasIdleConfig:
    3> store or replace the SSB measurement configuration from SIB4 into ssb-MeasConfig of the corresponding entry in the measIdleCarrierListNR within VarMeasIdleConfig;
  2> else:
    3> remove the ssb-MeasConfig of the corresponding entry in the measIdleCarrierListNR within VarMeasIdleConfig, if stored;

For example, one IE (idleModeMeasurements with ENUMERATED {eutra, nr, both}) or two separate IEs (i.e. one for NR, one for EUTRA) may be used to indicate to the UE to perform EUTRA and/or NR early measurements.

1> perform the measurements in accordance with the following:
  2> if the VarMeasIdleConfig includes the measIdleCarrierListEUTRA:
    3> for each entry in measIdleCarrierListEUTRA within VarMeasIdleConfig:
      4> if UE supports dual connectivity between the serving carrier and the carrier frequency indicated by carrierFreqEUTRA within the corresponding entry:
        5> perform measurements in the carrier frequency and bandwidth indicated by carrierFreq and allowedMeasBandwidth within the corresponding entry;
        5> if the measCellListEUTRA is included:
          6> consider the serving cell and cells identified by each entry within the measCellListEUTRA to be applicable for idle/inactive mode measurement reporting;
        5> else:
          6> consider the serving cell and up to maxCellMeasIdle strongest identified cells to be applicable for idle/inactive measurement reporting;
        5> if the reportQuantities is set to rsrq:
          6> consider RSRQ as the sorting quantity;
        5> else:
          6> consider RSRP as the sorting quantity;
        5> store measurement results as indicated by reportQuantities for cells applicable for idle/inactive measurement reporting whose RSRP/RSRQ measurement results are above the value(s) provided in qualityThreshold (if any) within the measReportIdleEUTRA in VarMeasIdleReport;
  2> if the VarMeasIdleConfig includes the measIdleCarrierListNR:
    3> for each entry in measIdleCarrierListNR within VarMeasIdleConfig that contains ssb-MeasConfig:
      4> if UE supports carrier aggregation or dual connectivity between serving carrier and the carrier frequency and subcarrier spacing indicated by carrierFreqNR and ssbSubCarrierSpacing within the corresponding entry:
        5> perform measurements in the carrier frequency and subcarrier spacing indicated by carrierFreq and ssbSubCarrierSpacing within the corresponding entry;
        5> if the measCellListNR is included:
          6> consider the serving cell and cells identified by each entry within the measCellListNR to be applicable for idle/inactive measurement reporting;
        5> else:
          6> consider the serving cell and up to maxCellMeasIdle strongest identified cells to be applicable for idle/inactive measurement reporting;
        5> if the reportQuantities is set to rsrq:
          6> consider RSRQ as the sorting quantity;
        5> else:
          6> consider RSRP as the sorting quantity;
        5> store measurement results as indicated by reportQuantities for cells applicable for idle/inactive measurement reporting whose RSRP/RSRQ measurement results are above the value(s) provided in qualityThreshold (if any) within the measReportIdleNR in VarMeasIdleReport;
        5> if the includeBeamMeasurements is included:
          6> if the reportQuantityRS-Indexes is set to rsrq:
            7> consider RSRQ as the sorting quantity;
          6> else:
            7> consider RSRP as the sorting quantity;
          6> store the beam measurement results as indicated by reportQuantityRS-Indexes within the measReportIdleNR in VarMeasIdleReport;

The fields s-NonIntraSearchP and s-NonIntraSearchQ in SIB2 do not affect the idle/inactive UE measurement procedures.

The UE is not required to perform idle/inactive measurements on a given carrier if the SSB configuration of that carrier provided via dedicated signaling is different from the SSB configuration broadcasted in the serving cell, if any.

1> if validityAreaList is configured in VarMeasIdleConfig:
  2> if the UE reselects to a serving cell on a frequency which does not match the carrierFreq of any entry in the validityAreaList; or
  2> if the UE reselects to a serving cell on a frequency which matches the carrierFreq of any entry in the validityAreaList, the validityCellList is included for the corresponding frequency, and the physical cell identity of the serving cell does not match any entry in validityCellList:
    3> if timer T331 is running;
      4> stop timer T331;

The UE shall:
1> if T331 expires or is stopped:
  2> release the VarMeasIdleConfig.

It is up to UE implementation whether to continue idle/inactive measurements according to SIB11 configuration after T331 has expired or stopped.

Table 5 shows an example of information element for idle measurement configuration. The IE MeasIdleConfig is used to convey information to UE about measurements requested to be done while in RRC_IDLE or RRC_INACTIVE.

TABLE 5

```
-- ASN1START
-- TAG-MEASIDLECONFIG-START
MeasIdleConfigSIB-r16 ::= SEQUENCE {
    measIdleCarrierListNR-r16           SEQUENCE (SIZE (1..maxFreqIdle-r16)) OF MeasIdleCarrierNR-r16
    measIdleCarrierListEUTRA-r16        SEQUENCE (SIZE (1..maxFreqIdle-r16)) OF MeasIdleCarrierEUTRA-r16
    ...
}
MeasIdleConfigDedicated-r16 ::= SEQUENCE {
    measIdleCarrierListNR-r16           SEQUENCE (SIZE (1..maxFreqIdle-r16)) OF MeasIdleCarrierNR-r16
    measIdleCarrierListEUTRA-r16        SEQUENCE (SIZE (1..maxFreqIdle-r16)) OF MeasIdleCarrierEUTRA-r16
    measIdleDuration-r16                ENUMERATED{sec10, sec30, sec60, sec120, sec180, sec240, sec300, spare},
    validityAreaList-r16        ValidityAreaList-r16
    ...
}
ValidityAreaList-r16 ::= SEQUENCE (SIZE (1..maxFreqIdle-r16)) OF ValidityArea-r16
ValidityArea-r16 ::=        SEQUENCE {
  carrierFreq-r16           ARFCN-ValueNR,
  validityCellList-r16      ValidityCellList}
ValidityCellList ::= SEQUENCE (SIZE (1.. maxCellMeasIdle-r16)) OF PCI-Range
MeasIdleCarrierNR-r16 ::=       SEQUENCE {
    carrierFreqNR-r16           ARFCN-ValueNR,
    ssbSubcarrierSpacing-r16    SubcarrierSpacing,
    frequencyBandList           MultiFrequencyBandListNR
    measCellListNR-r16          CellListNR-r16
    reportQuantities-r16        ENUMERATED {rsrp, rsrq, both},
    qualityThreshold-r16        SEQUENCE {
       idleRSRP-Threshold-NR-r16    RSRP-Range
       idleRSRQ-Threshold-NR-r16    RSRQ-Range
    }
    ssb-MeasConfig-r16          SEQUENCE {
       nrofSS-BlocksToAverage-r16       INTEGER (2..maxNrofSS-BlocksToAverage)
       absThreshSS-BlocksConsolidation-r16 ThresholdNR
       smtc-r16             SSB-MTC
       ssb-ToMeasure-r16            SSB-ToMeasure
       deriveSSB-IndexFromCell-r16      BOOLEAN,
       ss-RSSI-Measurement-r16          SS-RSSI-Measurement
-- if nrofSS-BlocksToAverage and absThreshSS-BlocksConsolidation should be defined
together with the carrierFreqNR (i.e. outside the ssb-MeasConfig structure)
    }
    beamMeasConfigIdle-r16      BeamMeasConfigIdle-NR-r16       OPTIONAL, -- Need FFS
    ...
}
MeasIdleCarrierEUTRA-r16 ::=   SEQUENCE {
  carrierFreqEUTRA-r16      ARFCN-ValueEUTRA,
  allowedMeasBandwidth-r16  EUTRA-AllowedMeasBandwidth,
  measCellListEUTRA-r16     CellListEUTRA-r16
  reportQuantities-r16      ENUMERATED {rsrp, rsrq, both},
  qualityThreshold-r16      SEQUENCE {
     idleRSRP-Threshold-EUTRA-r16  RSRP-RangeEUTRA
     idleRSRQ-Threshold-EUTRA-r16  RSRQ-RangeEUTRA-r16
  }                                 OPTIONAL, -- Need FFS
  ...
}
CellListNR-r16 ::=      SEQUENCE (SIZE (1..maxCellMeasIdle-r16)) OF PCI-Range
CellListEUTRA-r16 ::=       SEQUENCE (SIZE (1..maxCellMeasIdle-r16)) OF EUTRA-PhysCellIdRange
BeamMeasConfigIdle-NR-r16 ::= SEQUENCE {
  reportQuantityRS-Indexes-r16  ENUMERATED {rsrp, rsrq, both}   OPTIONAL, -- Need FFS
  maxNrofRS-IndexesToReport-r16         INTEGER  (1.. maxNrofIndexesToReport) OPTIONAL, -- Need FFS
  includeBeamMeasurements-r16  BOOLEAN
}
RSRQ-RangeEUTRA-r16 ::=   INTEGER (-30..46)
-- TAG-MEASIDLECONFIG-STOP
-- ASN1STOP
```

Hereinafter, idle/inactive Measurements procedure is described. This procedure specifies the measurements to be performed and stored by a UE in RRC_IDLE and RRC_INACTIVE when it has an idle/inactive measurement configuration.

Measurement configuration is described.

The UE shall update the idle/inactive measurement configuration on the reception of RRCRelease that contains an idle/inactive measurement configuration, on cell reselection while T331 is running and update of system information (SIB1, SIB4, and SIBx) while T331 is running.

While in RRC_IDLE or RRC_INACTIVE, T331 is running, the UE shall:
1> if validityAreaList is configured in VarMeasIdleConfig:
2> if the UE selects or reselects to a serving cell on a frequency which does not match the carrierFreq of any entry in the validityAreaList; or
2> if the UE selects or reselects to a serving cell on a frequency which matches the carrierFreq of an entry in the validityAreaList, the validityCellList is included for the corresponding frequency, and the physical cell identity of the serving cell does not match any entry in validityCellList:
3> if timer T331 is running;
4> stop timer T331;
4> release the VarMeasIdleConfig.
1> if the UE is capable of idle/inactive measurements for NE-DC and VarMeasIdleConfig does not contain a measIdleCarrierListEUTRA received from the RRCRelease message:
2> if SIBx includes the measIdleConfigSIB and contains measIdleCarrierListEUTRA:
3> store or replace the measIdleCarrierListEUTRA of measIdleConfigSIB of SIBx within VarMeasIdleConfig;
2> else:
3> remove the measIdleCarrierListEUTRA in VarMeasIdleConfig, if stored;
1> if the UE is capable of idle/inactive measurements for CA or NR-DC and VarMeasIdleConfig does not contain a measIdleCarrierListNR received from the RRCRelease message:
2> if SIBx includes the measIdleConfigSIB and contains measIdleCarrierListNR:
3> store or replace the measIdleCarrierListNR of measIdleConfigSIB of SIBx within VarMeasIdleConfig;
2> else:
3> remove the measIdleCarrierListNR in VarMeasIdleConfig, if stored;
1> for each entry in the measIdleCarrierListNR within VarMeasIdleConfig that does not contain an ssb-MeasConfig received from the RRCRelease message:
2> if there is an entry in measIdleCarrierListNR in measIdleConfigSIB of SIBx that has the same carrier frequency and subcarrier spacing as the entry in the measIdleCarrierListNR within VarMeasIdleConfig and that contains ssb-MeasConfig:
3> store or replace the SSB measurement configuration from SIBx into ssb-MeasConfig of the corresponding entry in the measIdleCarrierListNR within VarMeasIdleConfig;
2> else if there is an entry in carrierFreqListNR of SIB4 with the same carrier frequency and subcarrier spacing as the entry in measIdleCarrierListNR within VarMeasIdleConfig:
3> store or replace the SSB measurement configuration from SIB4 into ssb-MeasConfig of the corresponding entry in the measIdleCarrierListNR within VarMeasIdleConfig;
2> else:
3> remove the ssb-MeasConfig of the corresponding entry in the measIdleCarrierListNR within VarMeasIdleConfig, if stored;

Performing measurements is described.

While in RRC_IDLE or RRC_INACTIVE, T331 is running, the UE shall:
1> perform the measurements in accordance with the following:
2> if the VarMeasIdleConfig includes the measIdleCarrierListEUTRA and the SIB1 contains idleModeMeasurementsEUTRA:
3> for each entry in measIdleCarrierListEUTRA within VarMeasIdleConfig:
4> if UE supports dual connectivity between the serving carrier and the carrier frequency indicated by carrierFreqEUTRA within the corresponding entry:
5> perform measurements in the carrier frequency and bandwidth indicated by carrierFreq and allowedMeasBandwidth within the corresponding entry;
5> if the report Quantities is set to rsrq:
6> consider RSRQ as the sorting quantity;
5> else:
6> consider RSRP as the sorting quantity;
5> if the measCellListEUTRA is included:
6> consider the serving cell and cells identified by each entry within the measCellListEUTRA to be applicable for idle/inactive mode measurement reporting;
5> else:
6> consider the serving cell and up to maxCellMeasIdle strongest identified cells, according to the sorting quantity, to be applicable for idle/inactive measurement reporting;
5> store measurement results as indicated by report Quantities within the measReportIdleEUTRA in VarMeasIdleReport in decreasing order of the sorting quantity, i.e. the best cell is included first, as follows:
6> if qualityThreshold is configured:
7> include the measurement results from the cells applicable for idle/inactive measurement reporting whose RSRP/RSRQ measurement results are above the value(s) provided in qualityThreshold;
6> else:
7> include the measurement results from all cells applicable for idle/inactive measurement reporting;
2> if the VarMeasIdleConfig includes the measIdleCarrierListNR and the SIB1 contains idleModeMeasurementsNR:
3> for each entry in measIdleCarrierListNR within VarMeasIdleConfig that contains ssb-MeasConfig:
4> if UE supports carrier aggregation or dual connectivity between serving carrier and the carrier frequency and subcarrier spacing indicated by carrierFreqNR and ssbSubCarrierSpacing within the corresponding entry:
5> perform measurements in the carrier frequency and subcarrier spacing indicated by carrierFreq and ssbSubCarrierSpacing within the corresponding entry;
5> for each cell measurement quantity indicated within report Quantities:
6> if nrofSS-BlocksToAverage in the associated entry in measIdleCarrierListNR is not configured; or
6> if absThreshSS-BlocksConsolidation in the associated entry in measIdleCarrierListNR is not configured; or
6> if the highest beam measurement quantity value is below or equal to absThreshSS-BlocksConsolidation:
7> derive the cell measurement quantity based on SS/PBCH block as the highest beam measurement quantity value;

6> else:
7> derive the cell measurement quantity based on SS/PBCH block as the linear power scale average of the highest beam measurement quantity values above absThreshSS-Blocks Consolidation where the total number of averaged beams shall not exceed nrofSS-BlocksToAverage;
5> if the report Quantities is set to rsrq:
6> consider RSRQ as the sorting quantity;
5> else:
6> consider RSRP as the sorting quantity;
5> if the measCellListNR is included:
6> consider the serving cell and cells identified by each entry within the measCellListNR to be applicable for idle/inactive measurement reporting;
5> else:
6> consider the serving cell and up to maxCellMeasIdle strongest identified cells, according to the sorting quantity, to be applicable for idle/inactive measurement reporting;
5> store measurement results as indicated by report Quantities within the measReportIdleNR in VarMeasIdleReport in decreasing order of the sorting quantity, i.e. the best cell is included first, as follows:
6> if qualityThreshold is configured:
7> include the measurement results from the cells applicable for idle/inactive measurement reporting whose RSRP/RSRQ measurement results are above the value(s) provided in qualityThreshold;
6> else:
7> include the measurement results from all cells applicable for idle/inactive measurement reporting;
5> if beamMeasConfigIdle is included in the associated entry in measIdleCarrierListNR, for each cell in the measurement results:
6> derive beam measurements based on SS/PBCH block for each measurement quantity indicated in report QuantityRS-Indexes;
6> if the report QuantityRS-Indexes is set to rsrq:
7> consider RSRQ as the sorting quantity;
6> else:
7> consider RSRP as the sorting quantity;
6> set resultsSSB-Indexes to include up to maxNrofRS-IndexesToReport SS/PBCH block indexes in order of decreasing sorting quantity as follows:
7> include the index associated to the best beam for the sorting quantity and if absThreshSS-BlocksConsolidation is included, the remaining beams whose sorting quantity is above absThreshSS-BlocksConsolidation;
7> if the includeBeamMeasurements is set to true:
8> include the beam measurement results as indicated by report QuantityRS-Indexes;

The fields s-NonIntraSearchP and s-NonIntraSearchQ in SIB2 do not affect the idle/inactive UE measurement procedures. How the UE performs idle/inactive measurements is up to UE implementation as long as the requirements are met for measurement reporting.

The UE is not required to perform idle/inactive measurements on a given carrier if the SSB configuration of that carrier provided via dedicated signaling is different from the SSB configuration broadcasted in the serving cell, if any.

The UE shall:
1> if T331 expires or is stopped:
2> release the VarMeasIdleConfig.

It is up to UE implementation whether to continue idle/inactive measurements according to SIBx configuration after T331 has expired or stopped.

Hereinafter, a Non-Public Network (NPN) is described.

Non-public networks are intended for the sole use of a private entity such as an enterprise, and may be deployed in a variety of configurations, utilizing both virtual and physical elements. Specifically, they may be deployed as completely standalone networks, they may be hosted by a PLMN, or they may be offered as a slice of a PLMN.

In any of these deployment options, it is expected that unauthorized UEs, those that are not associated with the enterprise, will not attempt to access the non-public network, which could result in resources being used to reject that UE and thereby not be available for the UEs of the enterprise. It is also expected that UEs of the enterprise will not attempt to access a network they are not authorized to access. For example, some enterprise UEs may be restricted to only access the non-public network of the enterprise, even if PLMN coverage is available in the same geographic area. Other enterprise UEs may be able to access both a non-public network and a PLMN where specifically allowed.

Meanwhile, a wireless device could be configured with early measurements. The wireless device may perform measurement on the configured frequency and report the measurement results when network requests.

In the early measurement configuration, validity area can be configured. If cell list is included in a frequency in the validity area, the wireless device may keep the early measurement configuration while camping on the cell in the cell list. If cell list is not provided in a frequency in the validity area, the wireless device may keep the early measurement configuration while camping on any cell in the frequency. The wireless device, however, may delete the early measurement configuration and stop performing the early measurement when (re-)selected cell is out of validity area.

For example, such as under Non-Public Networks (NPN) deployment scenario, a cell with small coverage may be deployed together with normal cells on a frequency. In this case, the network may provide cell list in the validity area which only includes normal cells, because the NPN cells may not need early measurement reporting.

Then, if the wireless device reselects to the NPN cell, as the NPN cell is not included in the cell list in the validity area, the wireless device may delete the early measurement configuration and stop performing the early measurement. However, if the wireless device is in mobility, the wireless device may reselect back to normal cell soon. In this case, it may be unnecessary to delete the early measurement configuration.

Therefore, it may be beneficial to stop performing early measurement but keep the early measurement configuration while camping on the cell.

For example, to enable this scenario, it may be considered to provide such as suspension cell list on which the wireless device keeps early measurement configuration but does not perform early measurement while camping.

Hereinafter, a method for suspending measurement with measurement configuration in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

Figure 10:
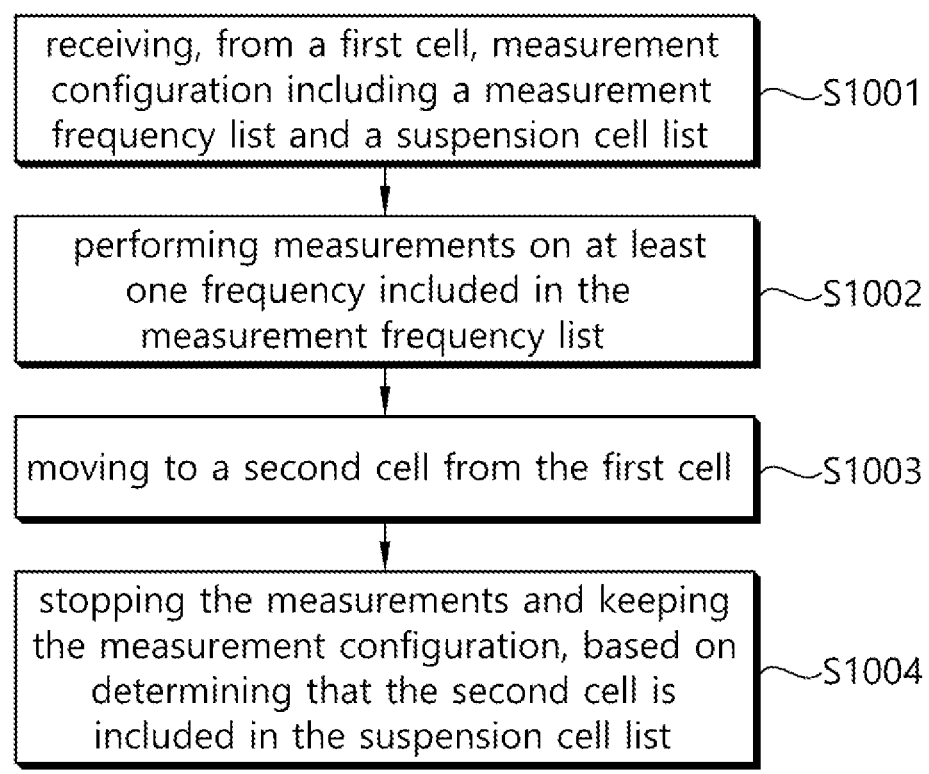
FIG. 10 shows an example of a method for suspending measurement with measurement configuration in a wireless communication system, according to some embodiments of the present disclosure.

FIG. 10 shows an example of a method for suspending measurement with measurement configuration in a wireless communication system, according to some embodiments of the present disclosure.

In particular, FIG. 10 shows an example of a method performed by a wireless device.

In step S1001, a wireless device may receive, from a first cell, measurement configuration including a measurement frequency list and a suspension cell list.

For example, the measurement configuration may be provided via dedicated signalling.

For example, the measurement configuration may be provided via broadcast signalling, for example, system information.

For example, the suspension cell list may include a Non-Public Networks (NPN) cell.

For example, the measurement configuration may include an early measurement configuration.

For example, the suspension cell list may include information on a cell list of each frequency. For example, the suspension cell list may include information on at least one frequency on which the wireless device does not perform measurements but keeps the measurement configuration. For example, the suspension cell list may consist of multiple cell lists, and each of the multiple cell list include at least on a cell identity of each frequency. For example, each of the multiple cell list may be mapped to each frequency.

For example, the measurement frequency list may include information on a cell list of each frequency. For example, the measurement frequency list may inform at least one frequency on which the wireless device performs measurements.

For example, the measurement configuration may include a validity area including a validity cell list for the measurement configuration. The measurement configuration may be valid for the wireless device while camping on a cell included in the validity cell list.

In step S1002, a wireless device may perform measurements on at least one frequency included in the measurement frequency list.

For example, the wireless device may perform early measurements on at least one frequency included in the measurement frequency list. For example, the wireless device may perform measurements on at least one frequency included in the measurement frequency list while in a Radio Resource Control (RRC) idle state and/or an RRC inactive state.

In step S1003, a wireless device may move to a second cell from the first cell.

For example, the wireless device may perform a cell selection procedure (or a cell reselection procedure) to move to the second cell.

In step S1004, a wireless device may stop the measurements and keeping the measurement configuration, based on determining that the second cell is included in the suspension cell list.

For example, a wireless device may store results of the measurements on the at least one frequency included in the measurement frequency list, based on determining that the second cell is included in the suspension cell list. In other words, the wireless device may not discard and keep the results of the measurements upon moving into the second cell.

According to some embodiments of the present disclosure, the measurement configuration may include the validity area.

In this case, the suspension cell list may include at least one cell which is not included in the validity cell list.

For example, a wireless device may stop to perform measurements and keep the measurement configuration, based on that (1) the second cell is included in the suspension cell list, and (2) the second cell is not included in the validity cell list.

For another example, a wireless device may discard the measurement configuration, based on that (1) the second cell is not included in the suspension cell list, and (2) the second cell is not included in the validity cell list.

For another example, a wireless device may continue to perform measurements on at least one frequency included in the measurement frequency list, based on that the second cell is included in the validity cell list.

According to some embodiments of the present disclosure, a wireless device may move to a third cell from the second cell. For example, the third cell may be included in the validity area.

In this case, the wireless device may restart to perform measurements on at least one frequency included in the measurement frequency list based on the kept measurement configuration.

According to some embodiments of the present disclosure, the measurement configuration may include a validity timer for the measurement configuration.

For example, the wireless device may perform measurements based on the measurement configuration while the validity timer is running. For example, the wireless device may delete the measurement configuration upon expiry of the validity timer.

In this case, a wireless device may keep the validity timer running upon moving into the second cell, based on determining that the second cell is included in the suspension cell list.

If a wireless device moves to the third cell and the third cell is included in the validity area, the validity timer may be kept to run, while the wireless device resumes the measurements based on the measurement configuration.

In other words, the validity timer may not be stopped when the wireless device moves to the second cell included in the suspension cell list.

According to some embodiments of the present disclosure, the wireless device may be in communication with at least one of a user equipment, a network, or an autonomous vehicle other than the wireless device.

Figure 11:
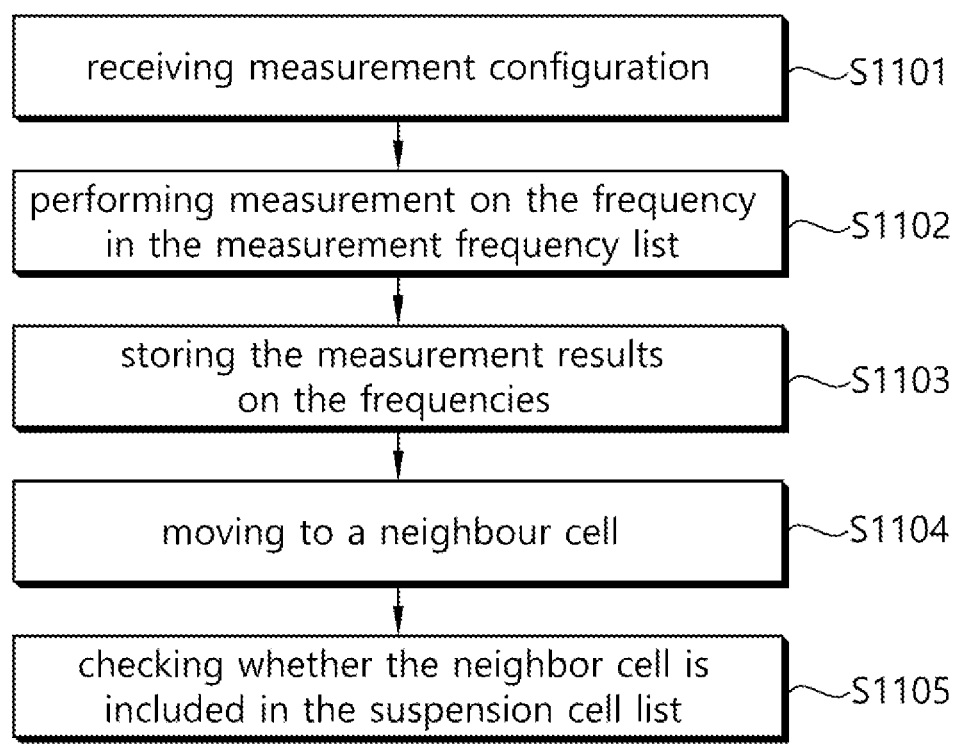
FIG. 11 shows an example of a method for suspending measurement with measurement configuration in a wireless communication system, according to some embodiments of the present disclosure.

FIG. 11 shows an example of a method for suspending measurement with measurement configuration in a wireless communication system, according to some embodiments of the present disclosure.

According to the present disclosure, when UE configured with early measurement is camping on a particular cell, the UE may stop performing early measurement, but may not discard the early measurement configuration.

In step S1101, a UE may receive measurement configuration. The measurement configuration may include a frequency list.

For example, the measurement configuration may be provided via dedicated signalling.

For example, the measurement configuration may be provided via broadcast signalling, for example, system information.

For example, the measurement configuration may include measurement frequency list which indicates at least one frequency on which the UE performs early measurements. The measurement frequency list may include cell list of each frequency.

For example, the measurement configuration may include suspension frequency list which indicates at least one frequency on which the UE does not perform early measurements but keeps the measurement configuration. The suspension frequency list may include suspension cell list of each frequency.

For example, the measurement configuration may include validity area.

For example, the validity area may include frequency list

For example, the validity area may include cell list of each frequency in the frequency list included in the validity area In step S1102, the UE may perform measurement on the frequency in the measurement frequency list received in step S1101.

In step S1103, the UE may store the measurement results on the frequencies.

In step S1104, the UE may move to a neighbour cell. The neighbour cell may become serving cell.

For example, the UE may perform cell reselection to move to the neighbour cell.

For example, the UE may perform cell selection to move to the neighbour cell.

In step S1105, the UE may check whether the serving cell is included in the suspension cell list received in step S1101.

According to some embodiments of the present disclosure, the serving cell may be included in the suspension cell list. In this case, the UE may stop performing measurement on the frequencies in the measurement frequency list received in step S1101. The UE may not perform the measurement while camping on the serving cell. In addition, The UE may not discard the measurement configuration even if the serving cell is not included in the validity area received in step S1101.

According to some embodiments of the present disclosure, the serving cell may be not included in the suspension cell list. In this case, if the serving cell is included in the validity area received in step S1101, the UE may continue the measurement on the frequency in the measurement frequency list received in step S1101. Otherwise, if the serving cell is not included in the validity area received in step S1101, the UE may discard the measurement configuration received in step S1101 and stop performing the measurement on the frequency in the measurement frequency list received in step S1101.

Hereinafter, an apparatus for suspending measurement with measurement configuration in a wireless communication system, according to some embodiments of the present disclosure, will be described. Herein, the apparatus may be a wireless device (100 or 200) in FIGS. 2, 3, and 5.

For example, a wireless device may perform methods described above. The detailed description overlapping with the above-described contents could be simplified or omitted.

Referring to FIG. 5, a wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to control the transceiver 106 to receive, from a first cell, measurement configuration including a measurement frequency list and a suspension cell list. The processor 102 may be configured to perform measurements on at least one frequency included in the measurement frequency list. The processor 102 may be configured to move to a second cell from the first cell. The processor 102 may be configured to stop the measurements and keep the measurement configuration, based on determining that the second cell is included in the suspension cell list.

For example, the suspension cell list may include a Non-Public Networks (NPN) cell.

For example, the processor 102 may be configured to store results of the measurements on the at least one frequency included in the measurement frequency list, based on determining that the second cell is included in the suspension cell list.

According to some embodiments of the present disclosure, the measurement configuration may include a validity area including a validity cell list for the measurement configuration. The measurement configuration may be valid for the wireless device while camping on a cell included in the validity cell list.

For example, the suspension cell list may include at least one cell which is not included in the validity cell list.

For example, the processor 102 may be configured to discard the measurement configuration, based on that (1) the second cell is not included in the suspension cell list, and (2) the second cell is not included in the validity cell list.

For example, the processor 102 may be configured to continue to perform measurements on at least one frequency included in the measurement frequency list, based on that the second cell is included in the validity cell list.

According so some embodiments of the present disclosure, the processor 102 may be configured to move to a third cell from the second cell. The processor 102 may be configured to restart to perform measurements on at least one frequency included in the measurement frequency list based on the measurement configuration.

According to some embodiments of the present disclosure, the measurement configuration may include an early measurement configuration. For example, the measurements on at least one frequency included in the measurement frequency list may be performed while in a Radio Resource Control (RRC) idle state and/or an RRC inactive state.

According so some embodiments of the present disclosure, the moving to the second cell from the first cell may include performing a cell selection procedure to move to the second cell.

For example, the suspension cell list may include information on a cell list of each frequency.

For example, the measurement frequency list includes information on a cell list of each frequency.

According to some embodiments of the present disclosure, the measurement configuration may include a validity timer for the measurement configuration. The measurement configuration may be deleted after the validity timer expires.

In this case, the processor 102 may be configured to keep the validity timer running, based on determining that the second cell is included in the suspension cell list.

According to some embodiments of the present disclosure, the processor 102 may be configured to be in communication with at least one of a user equipment, a network, or an autonomous vehicle other than the wireless device.

Hereinafter, a processor for a wireless device for suspending measurement with measurement configuration in a wireless communication system, according to some embodiments of the present disclosure, will be described.

The processor may be configured to control the wireless device to receive, from a first cell, measurement configuration including a measurement frequency list and a suspension cell list. The processor may be configured to control the wireless device to perform measurements on at least one frequency included in the measurement frequency list. The processor may be configured to control the wireless device to move to a second cell from the first cell. The processor may be configured to control the wireless device to stop the measurements and keep the measurement configuration, based on determining that the second cell is included in the suspension cell list.

For example, the suspension cell list may include a Non-Public Networks (NPN) cell.

For example, the processor may be configured to control the wireless device to store results of the measurements on the at least one frequency included in the measurement frequency list, based on determining that the second cell is included in the suspension cell list.

According to some embodiments of the present disclosure, the measurement configuration may include a validity area including a validity cell list for the measurement configuration. The measurement configuration may be valid for the wireless device while camping on a cell included in the validity cell list.

For example, the suspension cell list may include at least one cell which is not included in the validity cell list.

For example, the processor may be configured to control the wireless device to discard the measurement configuration, based on that (1) the second cell is not included in the suspension cell list, and (2) the second cell is not included in the validity cell list.

For example, the processor may be configured to control the wireless device to continue to perform measurements on at least one frequency included in the measurement frequency list, based on that the second cell is included in the validity cell list.

According so some embodiments of the present disclosure, the processor may be configured to control the wireless device to move to a third cell from the second cell. The processor may be configured to control the wireless device to restart to perform measurements on at least one frequency included in the measurement frequency list based on the measurement configuration.

According to some embodiments of the present disclosure, the measurement configuration may include an early measurement configuration. For example, the measurements on at least one frequency included in the measurement frequency list may be performed while in a Radio Resource Control (RRC) idle state and/or an RRC inactive state.

According so some embodiments of the present disclosure, the moving to the second cell from the first cell may include performing a cell selection procedure to move to the second cell.

For example, the suspension cell list may include information on a cell list of each frequency.

For example, the measurement frequency list includes information on a cell list of each frequency.

According to some embodiments of the present disclosure, the measurement configuration may include a validity timer for the measurement configuration. The measurement configuration may be deleted after the validity timer expires.

In this case, the processor may be configured to control the wireless device to keep the validity timer running, based on determining that the second cell is included in the suspension cell list.

According to some embodiments of the present disclosure, the processor may be configured to control the wireless device to be in communication with at least one of a user equipment, a network, or an autonomous vehicle other than the wireless device.

Hereinafter, a non-transitory computer-readable medium has stored thereon a plurality of instructions for suspending measurement with measurement configuration in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device.

The stored a plurality of instructions may cause the wireless device to receive, from a first cell, measurement configuration including a measurement frequency list and a suspension cell list. The stored a plurality of instructions may cause the wireless device to perform measurements on at least one frequency included in the measurement frequency list. The stored a plurality of instructions may cause the wireless device to move to a second cell from the first cell. The stored a plurality of instructions may cause the wireless device to stop the measurements and keep the measurement configuration, based on determining that the second cell is included in the suspension cell list.

For example, the suspension cell list may include a Non-Public Networks (NPN) cell.

For example, the stored a plurality of instructions may cause the wireless device to store results of the measurements on the at least one frequency included in the measurement frequency list, based on determining that the second cell is included in the suspension cell list.

According to some embodiments of the present disclosure, the measurement configuration may include a validity area including a validity cell list for the measurement configuration. The measurement configuration may be valid for the wireless device while camping on a cell included in the validity cell list.

For example, the suspension cell list may include at least one cell which is not included in the validity cell list.

For example, the stored a plurality of instructions may cause the wireless device to discard the measurement configuration, based on that (1) the second cell is not included in the suspension cell list, and (2) the second cell is not included in the validity cell list.

For example, the stored a plurality of instructions may cause the wireless device to continue to perform measurements on at least one frequency included in the measurement frequency list, based on that the second cell is included in the validity cell list.

According so some embodiments of the present disclosure, the stored a plurality of instructions may cause the wireless device to move to a third cell from the second cell. The stored a plurality of instructions may cause the wireless device to restart to perform measurements on at least one frequency included in the measurement frequency list based on the measurement configuration.

According to some embodiments of the present disclosure, the measurement configuration may include an early measurement configuration. For example, the measurements on at least one frequency included in the measurement frequency list may be performed while in a Radio Resource Control (RRC) idle state and/or an RRC inactive state.

According so some embodiments of the present disclosure, the moving to the second cell from the first cell may include performing a cell selection procedure to move to the second cell.

For example, the suspension cell list may include information on a cell list of each frequency.

For example, the measurement frequency list includes information on a cell list of each frequency.

According to some embodiments of the present disclosure, the measurement configuration may include a validity timer for the measurement configuration. The measurement configuration may be deleted after the validity timer expires.

In this case, the stored a plurality of instructions may cause the wireless device to keep the validity timer running, based on determining that the second cell is included in the suspension cell list.

According to some embodiments of the present disclosure, the stored a plurality of instructions may cause the wireless device to be in communication with at least one of a user equipment, a network, or an autonomous vehicle other than the wireless device.

Hereinafter, a method performed by a base station (BS) for suspending measurement with measurement configuration in a wireless communication system, according to some embodiments of the present disclosure, will be described.

The BS may transmit, to a wireless device, measurement configuration including a measurement frequency list and a suspension cell list.

The measurement frequency list may include at least one frequency on which the wireless device performs an early measurements.

The suspension cell list may include at least one cell on which the wireless device does not perform early measurements but keeps the measurement configuration.

Hereinafter, a base station (BS) for suspending measurement with measurement configuration in a wireless communication system, according to some embodiments of the present disclosure, will be described.

The BS may include a transceiver, a memory, and a processor operatively coupled to the transceiver and the memory.

The processor may be configured to control the transceiver to transmit, to a wireless device, measurement configuration including a measurement frequency list and a suspension cell list.

The measurement frequency list may include at least one frequency on which the wireless device performs an early measurements.

The suspension cell list may include at least one cell on which the wireless device does not perform early measurements but keeps the measurement configuration.

The present disclosure can have various advantageous effects.

According to some embodiments of the present disclosure, a wireless device could suspend early measurement while keeping measurement configuration efficiently.

For example, a wireless device configured to perform early measurements does not perform the early measurement when the wireless device (re)selects to a particular cell. The particular cell may be a cell with small coverage or does not need early measurement reporting. If the cell is deployed together with normal cells which needs early measurement reporting on a frequency, the wireless device could continue performing the early measurement when the wireless device reselects back to the normal cell.

According to some embodiments of the present disclosure, a wireless communication system could efficiently provide a solution for suspending early measurement without discarding measurement configuration.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method, comprising,
receiving, by a wireless device from a first cell, measurement configuration including a measurement frequency list and a suspension cell list,
wherein the measurement configuration includes a validity area including a validity cell list for the measurement configuration;
performing, by the wireless device, measurements on at least one frequency included in the measurement frequency list; and
moving, by the wireless device, to a second cell from the first cell;

based on that the second cell is included in the suspension cell list:
  stopping, by the wireless device, the measurements and keeping the measurement configuration;
based on that the second cell is not included in the suspension cell list:
  discarding, by the wireless device, the measurement configuration, based on that the second cell is not included in the validity cell list.

2. The method of claim 1, wherein the suspension cell list includes a non-public networks cell.

3. The method of claim 1, wherein the method further comprises,
  storing, by the wireless device, results of the measurements on the at least one frequency included in the measurement frequency list, based on determining that the second cell is included in the suspension cell list.

4. The method of claim 1, wherein the measurement configuration is valid for the wireless device while camping on a cell included in the validity cell list.

5. The method of claim 1, wherein the suspension cell list includes at least one cell which is not included in the validity cell list.

6. The method of claim 1, wherein the method further comprises,
  continuing, by the wireless device, to perform measurements on at least one frequency included in the measurement frequency list, based on that the second cell is included in the validity cell list.

7. The method of claim 1, wherein the method further comprises,
  moving, by the wireless device, to a third cell from the second cell; and
  restarting, by the wireless device, to perform measurements on at least one frequency included in the measurement frequency list based on the measurement configuration.

8. The method of claim 1, wherein the measurement configuration includes an early measurement configuration; and
  wherein the measurements on at least one frequency included in the measurement frequency list is performed while in a radio resource control idle state and/or a radio resource control inactive state.

9. The method of claim 1, wherein the moving to the second cell from the first cell further includes,
  performing, by the wireless device, a cell selection procedure to move to the second cell.

10. The method of claim 1, wherein the suspension cell list includes information on a cell list of each frequency.

11. The method of claim 1, wherein the measurement frequency list includes information on a cell list of each frequency.

12. The method of claim 1, wherein the wireless device is in communication with at least one of a user equipment, a network, or an autonomous vehicle other than the wireless device.

13. A wireless device comprising:
a transceiver;
a memory; and
at least one processor operatively coupled to the transceiver and the memory, and adapted to perform operations, the operations comprising:
  receiving, from a first cell, measurement configuration including a measurement frequency list and a suspension cell list,
    wherein the measurement configuration includes a validity area including a validity cell list for the measurement configuration;
  performing measurements on at least one frequency included in the measurement frequency list; and
  moving to a second cell from the first cell;
  based on that the second cell is included in the suspension cell list:
    stopping the measurements and keeping the measurement configuration;
  based on that the second cell is not included in the suspension cell list:
    discarding the measurement configuration, based on that the second cell is not included in the validity cell list.

14. The wireless device of claim 13, wherein the suspension cell list includes a non-public networks cell.

15. The wireless device of claim 13, wherein the operations further comprising:
  storing results of the measurements on the at least one frequency included in the measurement frequency list, based on determining that the second cell is included in the suspension cell list.

16. The wireless device of claim 13, wherein the measurement configuration is valid for the wireless device while camping on a cell included in the validity cell list.

17. A non-transitory computer-readable medium having stored thereon a plurality of instructions, which, when executed by a processor of a wireless device, cause the wireless device to perform operations, the operations comprising:
  receiving, from a first cell, measurement configuration including a measurement frequency list and a suspension cell list,
    wherein the measurement configuration includes a validity area including a validity cell list for the measurement configuration;
  performing measurements on at least one frequency included in the measurement frequency list; and
  moving to a second cell from the first cell;
  based on that the second cell is included in the suspension cell list:
    stopping the measurements and keeping the measurement configuration;
  based on that the second cell is not included in the suspension cell list:
    discarding the measurement configuration, based on that the second cell is not included in the validity cell list.

* * * * *